United States Patent
Lorenz et al.

(10) Patent No.: US 11,383,392 B2
(45) Date of Patent: Jul. 12, 2022

(54) SUPPORT FRAME FOR A HANDLING DEVICE, AND METHOD FOR PRODUCING A SUPPORT FRAME

(71) Applicant: J.Schmalz GmbH, Glatten (DE)

(72) Inventors: Thomas Lorenz, Dornstetten (DE); Kevin Huber, Renchen (DE); Peter Gröning, Deckenpfronn (DE)

(73) Assignee: J.Schmalz GmbH, Glatten (DE)

( * ) Notice: Subject to any disclaimer, the term of this patent is extended or adjusted under 35 U.S.C. 154(b) by 36 days.

(21) Appl. No.: 17/012,496

(22) Filed: Sep. 4, 2020

(65) Prior Publication Data
US 2021/0069915 A1 Mar. 11, 2021

(30) Foreign Application Priority Data
Sep. 5, 2019 (DE) ...................... 10 2019 123 916.8

(51) Int. Cl.
*B25J 15/06* (2006.01)
*B25J 9/00* (2006.01)
*B25J 19/00* (2006.01)

(52) U.S. Cl.
CPC ......... *B25J 15/0616* (2013.01); *B25J 9/0009* (2013.01); *B25J 19/007* (2013.01)

(58) Field of Classification Search
CPC .. B25J 15/0616; B25J 15/0675; B25J 9/0009; B25J 19/007; B66C 1/0243; B66C 1/0287
USPC .......................................................... 294/65
See application file for complete search history.

(56) References Cited

U.S. PATENT DOCUMENTS

| | | | |
|---|---|---|---|
| 750,667 A * | 1/1904 | Lewellyn et al. | |
| 2,578,220 A * | 12/1951 | Billner | B63C 7/22 |
| | | | 294/65 |
| 3,183,032 A * | 5/1965 | Warfel | B66C 1/0231 |
| | | | 294/65 |
| 5,259,859 A * | 11/1993 | Claassen | C03B 35/145 |
| | | | 65/182.2 |
| 6,467,825 B1* | 10/2002 | Wicen | B66C 1/0212 |
| | | | 294/64.3 |
| 9,962,828 B2* | 5/2018 | Barber | B25J 15/0616 |
| 2008/0246290 A1* | 10/2008 | Johansson | B25J 19/007 |
| | | | 294/65 |

(Continued)

FOREIGN PATENT DOCUMENTS

DE 10 2013 222 108 B3 2/2015
DE 10 2016 212 141 A1 1/2018

*Primary Examiner* — Dean J Kramer
(74) *Attorney, Agent, or Firm* — Aslan Law, P.C.

(57) ABSTRACT

A support frame for a handling device comprising a base body and at least two structural elements extending away from the base body, at least two structural elements being constructed similarly to each other in that they have at east the following common characteristics: a radial beam which is elongated and has a first end and a second end, the second end having a connecting section for connection to a pneumatically actuatable gripping element, a lattice wing which is integrally connected with the radial beam and runs between the first end of the radial beam and the second end of the radial beam, the lattice wing extending flatly away from the radial beam, wherein for each of the at least two structural elements the first end of the radial beam is integrally connected with the base body in a manner that the radial beam extends away from the base body.

25 Claims, 6 Drawing Sheets

(56) References Cited

U.S. PATENT DOCUMENTS

2012/0210818 A1    8/2012  Fischer et al.
2019/0152058 A1*   5/2019  Hang .................. B25J 15/0052

* cited by examiner

SUPPORT FRAME FOR A HANDLING DEVICE, AND METHOD FOR PRODUCING A SUPPORT FRAME

CROSS-REFERENCE TO RELATED APPLICATIONS

This application claims priority to DE Patent Application No. 10 2019 123 916.8 filed on Sep. 5, 2019, the entire contents of which are hereby incorporated by reference.

DESCRIPTION

The invention relates to a support frame for a handling device, having at least two pneumatically actuatable gripping elements. The invention also relates to a method for producing such a support frame.

Handling devices are used to hold and/or handle objects, for example to transport workpieces between different processing locations or to hold a workpiece while it is being processed. Such handling devices usually comprise at least two, in particular more than two, pneumatically actuatable gripping elements which are held on a support frame, for example in the manner of a so-called vacuum suction spider. A large number of components must be connected to each other in order to assemble the support frame and to arrange the gripping elements on the support frame. This makes it difficult to realize a simple construction, and often leads to complex and therefore error-prone designs. In addition, it is difficult to implement a configuration of the handling device based on requirements which meets specific gripping requirements which arise, for example, from the geometry and properties of a workpiece being gripped.

The present invention is concerned with the task of enabling a simple configuration for a handling device that can be adapted to different requirements.

This problem is solved by a support frame having the features of claim 1. The support frame is designed to be used in a handling device having at least two, in particular more than two, pneumatically actuatable gripping elements. The gripping elements can be suction gripping elements, for example in the form of bellows suction cups. It is also possible for the gripping elements to be designed as pneumatically actuatable mechanical gripping elements, for example in the form of fluid elastomer actuators.

The support frame comprises a base body and at least two, in particular more than two, structural elements that extend away from the base body. The at least two structural elements are all topologically similar to each other, specifically in that they have at least the following common features:
- a radial beam of elongated design, having a first end and having a second end, the second end having a connecting section for a connection to a pneumatically actuatable gripping element (the radial beam thus serves as a supporting structure for a gripping element);
- a lattice wing which is integrally/monolithically connected with the radial beam and which extends with a connecting edge between the first end of the radial beam and the second end of the radial beam, wherein the lattice wing extends flatly away from the radial beam.

For each of the at least two structural elements, the first end of the radial beam is connected integrally to the base body in such a manner that the radial beam extends away from the base body. In this respect, the second (free) end of the radial beam is arranged at a distance from the base body.

The lattice wing of each structural element is in turn integrally connected with an adjacent structural element in such a manner that a further connecting edge of the lattice wing extends between the first end of the radial beam of the adjacent structural element and its second end. In this respect, the structural elements are integrally connected with each other via the lattice wings in such a manner that a monolithic overall structure of the support frame is created. In particular, in the finished overall structure, it is ultimately indistinguishable to which radial beam the lattice wing belongs.

According to the number and arrangement of structural elements, a support frame can be configured as required to meet different gripping requirements. According to requirements, only the dimensions, the exact shape and the arrangement of the structural elements need to be determined and the structural elements then connected to each other as described. A structural element comprising radial beams and lattice wings thus forms a basic building block for the construction of a support frame. The number of radial beams then defines in particular a number of gripping points, with a shape and arrangement of the radial beams then defining the specific positions of the gripping points.

According to a given design of a workpiece to be gripped (e.g. with regard to geometry and weight) and/or according to the gripping process conditions (e.g. with regard to an expected maximum acceleration during a gripping process), a support frame can be initially designed and configured to meet requirements with regard to a number of structural elements and the with regard to the shape (for example, with computer aided design), and then the support frame can be individually manufactured, in particular using generative manufacturing techniques.

An individual production of such a support frame is in turn favored precisely by the structure of the structural elements comprising the radial beams and the lattice wings according to the invention. Because the radial beams are connected to each other by the lattice wings and are thus reinforced, the radial beams and also the lattice wings can be made comparatively thin-walled. This makes it possible to produce a support frame according to the invention in an efficient manner by means of generative manufacturing processes and/or additive manufacturing processes, in particular 3D printing. This not only makes it possible to manufacture a support frame with differently shaped and arranged structural elements, but it is in particular also possible to produce such a support frame economically, even in small series (lot size of 1).

In order to produce an individually configured support frame, in particular a method is carried out, which comprises the following steps, in particular in the order specified:

First, boundary conditions for a design of the support frame are provided in a data processing system. The boundary conditions include at least one first boundary condition which represents a number of gripping points. The first boundary condition represents the number of points at which a workpiece should be gripped, and therefore, in particular, how many gripping elements are required. The boundary conditions also include a second boundary condition which represents positions of the gripping points. The second boundary condition represents where the gripping elements should engage the workpiece. The boundary conditions are provided in particular in the form of a configuration dataset and then saved in a storage device of the data processing system. The configuration dataset represents, in particular, shape conditions for the support frame and/or loading conditions and/or workpiece information such as, for example, weight and material properties of the workpiece type which is to be handled with the handling device.

After the boundary conditions have been provided, a configuration of the support frame is determined by means of the data processing system according to the boundary conditions. A number of structural elements is determined according to the number of gripping points. In particular, a number of the structural elements corresponds to the number of gripping points. Furthermore, a shape and arrangement of a radial beam is determined according to the positions of the gripping points. The shape and arrangement of the radial beam are determined under the boundary condition that the first end of the radial beam is integrally connected with the base body. In particular, the shape and arrangement of the radial beam are also determined under the boundary condition that the second end of the radial beam is arranged at a fixed distance relative to a gripping point assigned to it, the distance being determined in particular according to a selected gripping element type (see below).

Furthermore, a shape and arrangement of a lattice wing which is assigned to a radial beam, are determined. The shape and arrangement of the lattice wing are determined under the boundary condition that the lattice wing is connected on the one hand to the radial beam which is assigned to it, and on the other hand to an adjacent radial beam in such a manner that the lattice wing with its connecting edges runs in each case between the first end and the second end of the given radial beam.

In addition, a shape and arrangement of the base body are also particularly determined, in particular according to the shape and arrangement of the radial beam.

According to the method, in a further step a support frame dataset is then determined using the data processing system, wherein the support frame dataset represents the shape of the support frame, in particular an overall structure of the support frame configured according to the boundary conditions.

In a further step, the support frame is produced according to the support frame dataset by means of a device for additive manufacturing of components, in particular a 3D printer. For this purpose, control signals are first generated which cause the device for additive manufacturing of components to produce a support frame with an overall structure according to the support frame dataset, in particular by means of the data processing system; the device for additive manufacturing of components is then controlled according to the control signals.

Such a method makes it possible, in a simple and economical manner, to provide a support frame which individually meets specific requirements (for example in relation to the shape of a workpiece to be handled and/or loading states of a gripping process).

The data processing system can be a control computer for a device for additive manufacturing of components, for example a 3D printer. The data processing system preferably comprises further computers which communicate with the control computer, for example via a server connection, especially via a cloud connection. The boundary conditions and the configuration of the support frame and/or the production of the support frame can then be implemented at spatially separate locations. For example, it is conceivable that a user (for example an employee of a company commissioning the production of a support frame) provides the boundary conditions via a web interface from a computer and then these boundary conditions are transmitted via a server connection to a control computer (for example, located at the manufacturing company) of the device.

At least one of the radial beams of the respective structural elements (or all of the radial beams) is preferably of tubular design with an internal fluid channel which extends from the first end to the second end of the radial beam. At the second end of the radial beam, the fluid channel preferably opens into the connecting section in such a manner that a gripping element connected to the connecting section is has a fluid connection and pressure connection with the fluid channel. A radial beam designed in this manner serves both as a support structure for a gripping element and as a fluid guide to supply the gripping element with negative or positive pressure. In this respect, the gripping elements no longer have to be connected to a negative or positive pressure supply by means of hoses. This prevents hose connections from forming an interference contour during the handling of objects. In particular, saving the hose material results in low weight of the handling device. When using such a handling device in automated processing plants, it is therefore only necessary to move lower masses, and energy can be saved. Moreover, such a handling device is comparatively inexpensive. However, it is also conceivable to design the radial beam without a fluid channel, in particular with the function of a support element.

To produce such a support frame, the shape and arrangement of the radial beam are then determined, in particular further under the boundary condition that the radial beam is of tubular design with an internal fluid channel which runs from the first end to the second end of the radial beam.

To supply the fluid channels with negative or positive pressure, it is further preferred that the base body has at least one pneumatic connection section for connection to an external negative or positive pressure supply, and a fluid distribution chamber connected to the at least one pneumatic connection section. The distribution chamber is in particular integrated into the base body—that is, in particular bounded by an outer wall of the base body. The fluid channels of the radial beam are then in particular designed and arranged in such a manner that they open into the distributor chamber at the first end of the radial beam. In this respect, the individual fluid channels can be supplied with negative or positive pressure together via the distributor chamber. In particular, it is not necessary to connect the fluid channels to an external supply line via separate connections. A handling device with such a support frame is therefore of compact construction. Complexity of assembly can also be reduced.

The fluid channels preferably open into the distribution chamber via separate openings. Negative or positive pressure can then be applied to the fluid channels independently. This makes it possible to selectively activate or deactivate individual gripping elements. For this purpose, it is preferred that the support frame additionally comprises a receiving space for receiving a valve device for controlling the individual fluid channels.

To produce such a support frame, a shape and arrangement of the base body are then determined, in particular further under the boundary condition that the base body has at least one pneumatic connection section and a distributor chamber connected to the at least one pneumatic connection section. Furthermore, the shape and arrangement of the base body and the shape and arrangement of the radial beam are determined, in particular under the boundary condition that the fluid channels of the radial beam open into the distribution chamber of the base body.

A specific configuration of the at least one pneumatic connection section is preferably provided as a boundary condition for the design of the support frame, in particular by selecting from among configurations of a pneumatic connection section in a database stored in the data processing system.

In an advantageous embodiment of the support frame, the radial beam of the respective structural elements can be in particular curved, at least in sections, along its longitudinal extension from the first to the second end. This can apply to one, several or all radial beams. In this way a favorable load distribution is achieved. A connecting edge of a lattice wing connected to the radial beam then also runs along a curve. The radial beams are preferably curved in such a manner that a gripping element arranged on each of the respective connecting sections can engage on this surface in a direction orthogonal to a surface to be gripped. For gripping and handling plate-shaped objects, the radial beams can in particular be curved in such a manner that the second ends of the radial beams lie in a common plane.

To produce such a support frame, the shape and arrangement of the radial beam are then in particular determined further under the boundary condition that at least one of the radial beams is at least partially curved. For the manufacturing process, such a configuration of the radial beam also has the advantage that material which has not been processed, for example material powder, can be removed from the fluid channels in a simple manner in the course of a 3D printing process.

To simplify the installation of a gripping element on a radial beam, it is further preferred if the radial beam has a groove in the region of its connecting section which is arranged on its outside and surrounds the radial beam along its circumference, in particular perpendicular to the longitudinal extension of the radial beam. Such a groove serves as an installation aid for the gripping elements. The gripping elements can also be installed, for example, if the surface quality and manufacturing accuracy of the support frame is not optimal.

To produce such a support frame, the shape and arrangement of the radial beam are then in particular determined further under the boundary condition that the radial beam in the region of its connecting section has a groove arranged on its outside and encircling the radial beam along its circumference.

For an improved stability of the support frame, it is also preferred if the lattice wing is integrally connected with the base body. In particular, the lattice wing extends with a connecting edge on an outer wall of the base body from the first end of the radial beam assigned to the lattice wing to the first end of the radial beam connected to this radial beam via the lattice wing.

To produce such a support frame, the shape and arrangement of the lattice are then determined, in particular further under the boundary condition that the lattice wing is integrally connected with the base body.

Due to the fact that the lattice wings extend from the first end to the second end of each radial beam, at least a partial area of an intermediate space between two radial beams is closed off by the lattice wing. This provides effective protection against unintentional reaching between the radial beams, for example by an operator. For a particularly effective protection against this reaching, it is particularly preferred if the connecting edge of the lattice wing extends completely from the first end of a radial beam which is connected to it to the second end of this radial beam. In addition, a support frame designed in this way is particularly stable.

To produce such a support frame, the shape and arrangement of the lattice wing are then in particular determined further under the boundary condition that the lattice wing extends with a connecting edge completely from the first end of a radial beam which is connected to it to the second end of this radial beam. Such an embodiment can, for example, facilitate production by means of 3D printing, since process-related support structures which support the lattice wing during a printing process can be at least partially dispensed with.

In particular, the lattice wing has an outer edge which delimits the lattice wing in the direction facing away from the base body, in particular in the direction of the second ends of the radial beams connected to this lattice wing. The outer edge can in particular have a bent or curved shape, for example running concavely with respect to the base body. The outside edge is then, in particular, designed with an arcuate course in such a manner that a distance from the outer edge to the base body in each connection region of the outer edge to the first ends of the radial beams connected to the lattice wing is greater than in a central region of the outer edge in relation to its longitudinal extension from the first radial beam to the second radial beam. In such an embodiment, comparatively more space is then made available between two gripping elements, which also favors gripping of complexly shaped objects. Nevertheless, sufficient stability of the support frame is ensured. According to the shape requirements, the outer edge can also be wavy or convex with respect to the base body. A straight course is also conceivable. It is possible that the outer edge is formed by a cross strut which bounds the lattice wing in the direction facing away from the base body.

To produce such a support frame, the shape and arrangement of the lattice wing are then in particular determined further under the boundary condition that an outer edge of the lattice wing which delimits the lattice wing in the direction facing away from the base body is designed to be concave with respect to the base body.

To reduce the risk of injury to an operator, it is preferred that the lattice wing is designed in such a manner that a maximum diameter of the lattice openings does not exceed 20 mm, in particular 10 mm, further in particular 8 mm. This can in particular reduce the risk of an operator getting a finger caught in a lattice opening.

To produce such a support frame, the shape and arrangement of the lattice wing are then determined, in particular further under the boundary condition that the lattice wing is designed such that a maximum diameter of the lattice openings does not exceed 20 mm, in particular 10 mm, further in particular 8 mm.

To reduce the risk of injury, it is further preferred if the edges delimiting the radial beam and/or the lattice wing are rounded. To produce such a support frame, the shape and arrangement of the radial beam and the lattice wing are then in particular determined further under the boundary condition that edges delimiting the radial beam or lattice wing are rounded off with an edge radius. This can be done by the edge having an edge radius of greater than 0.1 mm.

Basically, the lattice wing can have any lattice geometries. However, it is particularly preferred if the lattice wing is designed as a honeycomb lattice. Such a lattice is characterized by high stability with a comparatively low use of materials. The honeycombs can be polygonal, in particular in the form of a symmetrical polygon, or also round, for example circular.

To produce such a support frame, the shape and arrangement of the lattice wing are then in particular determined further under the boundary condition that the lattice wing is designed as a honeycomb lattice.

In an advantageous embodiment, the base body can furthermore have a flange section which is designed to connect the support frame to an external component. The external component can in particular be a robot arm. Then the flange section is designed in particular to be connected to a tool flange of the robot arm. It is also possible that the external component is a—in particular, electrical—vacuum generation unit. The vacuum generation unit can then in particular be designed such that, in addition to a connection section, it also has a vacuum outlet for connection to the pneumatic connection section of the support frame on a side intended for connection to the flange section of the support frame. Then it is particularly preferred if the pneumatic connection section is integrated into the flange section. For example, it is conceivable that the base body has a connecting piece in the region of the flange section for connection to the vacuum outlet of the vacuum generation unit. The connecting piece is then preferably connected to the distribution chamber of the base body in terms of flow and pressure.

To produce such a support frame, the shape and arrangement of the base body are then determined, in particular further under the boundary condition that the base body has a flange section. A specific configuration of the flange section is then provided in particular as a further boundary condition, preferably by selecting a configuration of the flange section from configurations of the flange section available in a database stored in the data processing system. It is also possible for a specific flange geometry (for example a specific number and arrangement of bores) to be provided by a user as a further boundary condition for the method.

It is possible for the flange section, in particular the base body, to be centered with respect to a surface which is delimited by a line encircling (enveloping) the second ends of the radial beams. It is also possible for the flange section, in particular the base body, to be arranged off-center. To produce a support frame, a relative position of the flange section can then be provided as a further boundary condition under which the shape and arrangement of the radial beam and the lattice wing are determined.

In the context of a further advantageous embodiment, the base body can also have a receiving space for receiving at least one vacuum ejector (for generating negative pressure from compressed air). A negative pressure required to actuate the at least two gripping elements can then be generated in the handling device itself. In particular, no negative pressure has to be supplied to the handling device via external negative pressure supply lines. Instead, only compressed air has to be supplied via the at least one pneumatic connection section, which is technically easier to implement. In such an embodiment, the distribution chamber of the base body is then in particular designed in such a manner that it is connected in terms of flow and pressure to a vacuum outlet of a vacuum ejector received in the receiving space.

To produce such a support frame, the shape and arrangement of the base body are then in particular determined further under the boundary condition that the base body has a receiving space for receiving at least one vacuum ejector.

The base body can furthermore have a receiving space for receiving a valve device, for example for controlling a supply of negative pressure or positive pressure to the handling device. In this respect, the valve device can be integrated into the base body. This prevents the valve device from forming an interference contour during the handling of objects.

To produce such a support frame, the shape and arrangement of the base body are then determined, in particular further under the boundary condition that the base body has a receiving space for receiving a valve device.

In the embodiments of the method for producing the support frame explained above, the number of gripping points, which represents a first boundary condition for a design of the support frame, is determined in particular with the aid of the data processing system. For this purpose, workpiece information relating to a workpiece to be gripped, in particular information on the shape and weight of the workpiece, is first provided in the data processing system. In particular, the workpiece information is stored in a storage device of the data processing system. Furthermore, gripping process information is provided in the data processing system, in particular stored in a storage device of the data processing system. The gripping process information can be, for example, an expected maximum acceleration during a gripping process, expected gripping forces, etc. The gripping process information can be provided in particular by entering and/or selecting gripping process information in the data processing system, in particular by means of an input device. According to the workpiece information and gripping process information provided, the number of gripping points required for gripping the workpiece is then determined in a further step by means of the data processing system. The number of points at which a handling device must grip a workpiece with a gripping element is accordingly determined. Such an embodiment of the method facilitates the configuration of a support frame. A user only has to provide information about the workpiece and the gripping process and the data processing system then determines the required number of gripping points.

The workpiece information can be provided in particular by a user providing geometry data of a workpiece to be gripped and then entering further workpiece properties, in particular a total workpiece weight, in the data processing system, in particular via an input device. It is possible for the geometry data of a workpiece to be gripped to be provided for the data processing by reading, in particular uploading, a workpiece dataset (CAD data) representing the overall structure of the workpiece to be gripped. It is also possible that first a workpiece standard geometry (e.g. pouches, cardboard, etc.) is selected from workpiece standard geometries available in a database stored in the data processing system, in particular by a user, and then the specific workpiece dimensions, in particular length and/or width and/or height, are input.

Preferably, the number of gripping points is also determined according to information provided in the data processing system relating to a gripping element type which will be used later. In particular, the information on the gripping element type is provided a gripping element type being selected from gripping element types present in a database stored in the data processing system, in particular by a user.

The positions of the gripping points, which represent a second boundary condition for designing the support frame, are preferably also determined in the above-described configurations of the method for producing the support frame by means of the data processing system. For this purpose, geometric data of a workpiece to be gripped are first provided, as described above. The overall structure of the workpiece to be gripped is then displayed according to the geometry data by means of a display device, in particular a screen, connected to the data processing system. For this purpose, display signals in particular are determined on the basis of the geometry data of the workpiece provided, which cause a display device connected to the data processing system to display the overall structure of the workpiece to be gripped according to the geometry data.

In a further step, corresponding gripping points on the workpiece shown are then selected and/or entered by a user.

The method for producing the support frame is carried out, in particular, with the aid of a computer, by means of a computer program for a data processing system, in particular for a data processing system which is designed to control a device for additive manufacturing of components. The computer program is represented in a corresponding computer program product which comprises coding means which, when executed by the data processing system, cause the data processing system to carry out the following steps, in particular in the order given:

First, a user interface is provided, which is configured to receive user input by means of the data processing system. The user inputs include information which represent boundary conditions for the design of a support frame. The provision of the user interface can in particular include the provision of display signals which cause a display device, in particular a screen, connected to the data processing system to display a screen mask with corresponding input windows. The input windows are particularly configured to enter and/or select information on a workpiece to be gripped, a gripping process and/or a gripping element type (see above). Input and/or selection is preferably carried out via an input device connected to the data processing system, for example a touchscreen, keyboard, etc.

In a further step, the user inputs are received via the user interface. In particular, the user inputs received are stored in a storage device of the data processing system.

In a further step, boundary conditions for a configuration of the support frame are determined from the user inputs. In particular, a first boundary condition is determined which represents a number of gripping points. In particular, a second boundary condition is also determined which represents the positions of the gripping points (see above).

In a further step, a support frame dataset is then determined which represents the shape of the support frame, in such a manner that the boundary conditions are met. In particular, the support frame dataset is also determined according to further boundary conditions which are stored in a storage device of the data processing system. The determination of the framework dataset particularly comprises the following steps:
 aa) determining a number of structural elements according to the number of gripping points;
 bb) determining a shape and arrangement of a radial beam according to the positions of the gripping points, the shape and arrangement of the radial beam being determined under the boundary condition that the first end of the radial beam is integrally connected with the base body;
 cc) determining a shape and arrangement of a lattice wing which is assigned to a radial beam, the shape and arrangement of the lattice wing being determined under the boundary condition that the lattice wing is connected on the one hand to said radial beam and on the other hand to an adjacent radial beam in such a manner that the lattice wing in each case runs between the first end and the second end of the radial beam.

In a further step, control signals are then generated which cause a device for additive manufacturing of components connected to the data processing system to produce a support frame having an overall structure according to the support frame dataset.

In particular, the computer program also includes coding means which cause the data processing system to implement the advantageous embodiments of the method for producing the support frame explained above when determining the boundary conditions and/or when determining the support frame dataset.

As already explained above in relation to the method, the data processing system can in particular comprise several computers. It is then possible in particular for individual sub-steps of the computer program to be carried out on different computers in the data processing system.

The invention will be explained in more detail in the following with reference to the drawings.

Figure 1:
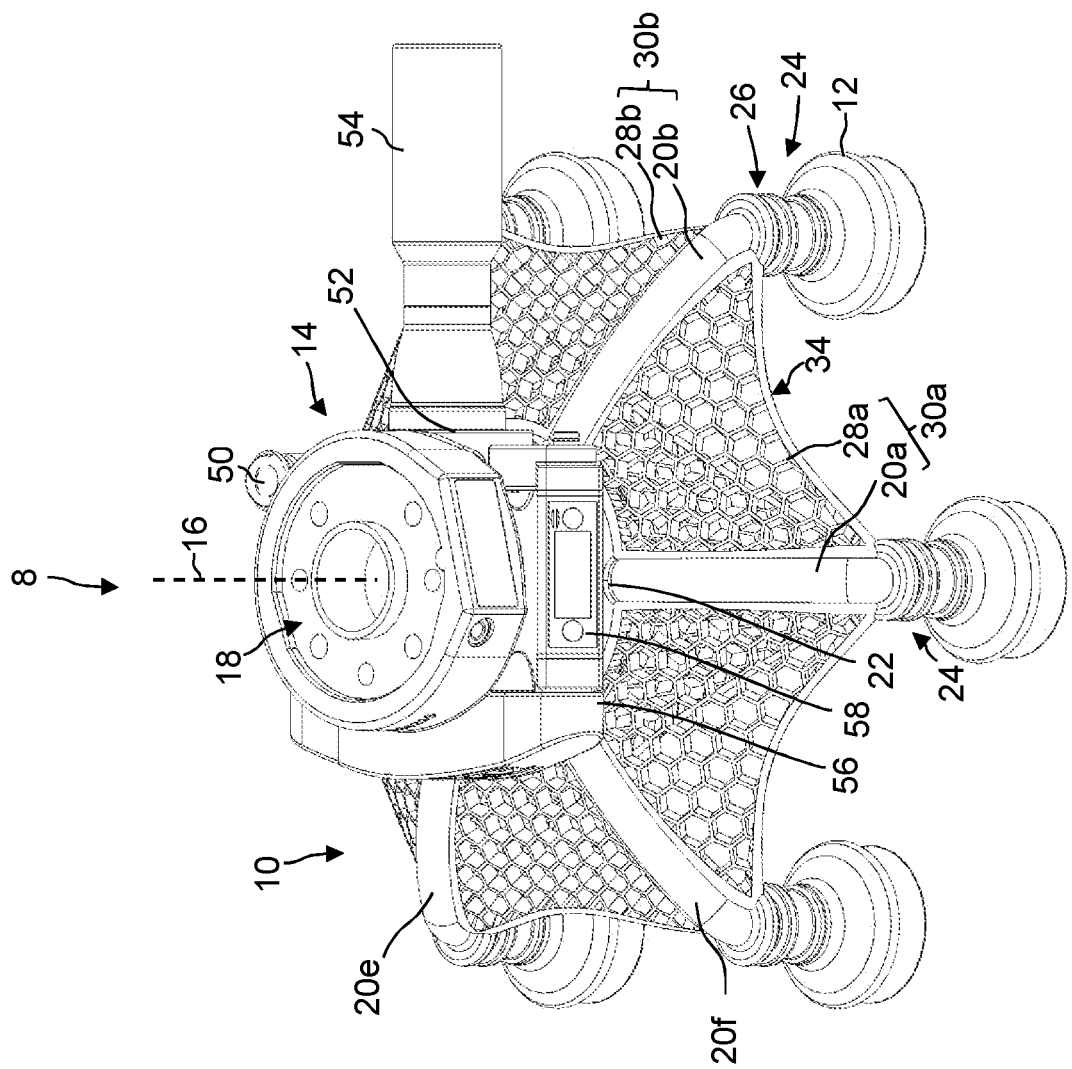
FIG. 1 is a sketched representation of an embodiment of a handling device comprising a support frame according to the invention, in a perspective view.

In the following description and in the drawings, the same reference signs are used in each case for identical or corresponding features.

A handling device is shown in FIG. 1, designated overall by the reference numeral 8. The handling device 8 comprises a support frame 10 according to the invention and gripping elements 12 connected to the support frame 10 in a manner described in more detail below, for gripping a workpiece (not shown). In the example shown here, the gripping elements 12 are designed as bellows suction cups, which can be activated and deactivated pneumatically. In embodiments that are not shown, the gripping elements 12 can also be designed as pneumatically actuatable mechanical gripping elements, for example in the form of fluid-elastomer actuators.

The support frame 10 comprises a base body 14 which extends along a central axis 16. On a top side, the base body 14 has a flange section 18 which is designed to connect the support frame 10 to an external component (not shown), by way of example, and preferably, for connection to a tool flange of a robot arm.

Figure 4:
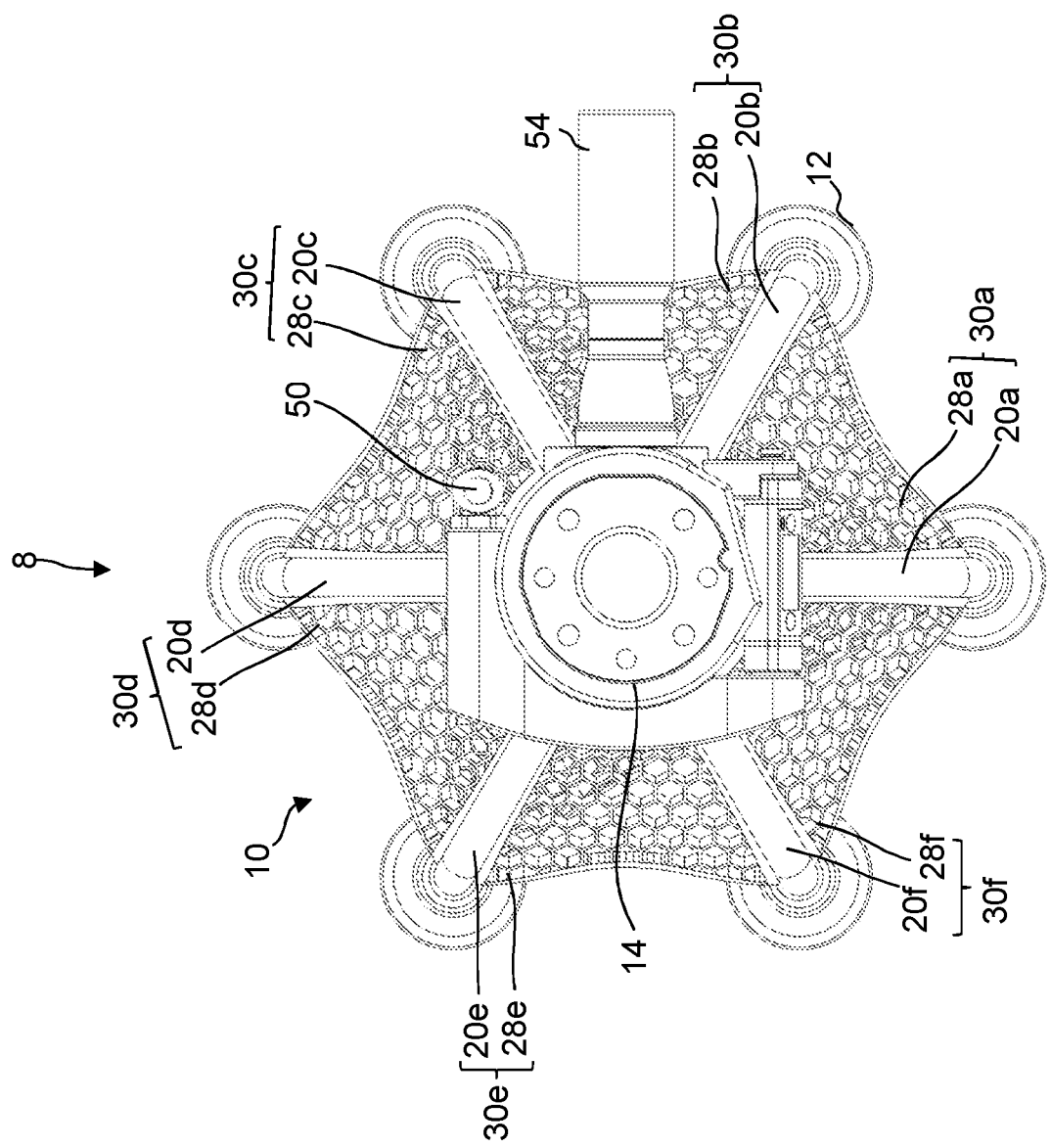
FIG. 4 is a sketched representation of the handling device according to FIG. 1, in a plan view.

Several radial beams 20a-f are arranged on the base support 14—six in the example shown—each of which is integrally connected by a first end 22 to the base body 14, extending away from the base body 14 towards a second (free) end 24 (see FIGS. 1 and 4). On the second end 24 of each radial beam 20a-f, there is a connecting section 26 via which the radial beam 20a-f is connected to a gripping element 12 (explained in more detail below). The radial beams 20a-f thus serve as a supporting structure for the gripping elements 12. In the embodiment shown, the number of radial beams 20a-f corresponds to the number of gripping elements 12, and thus to a number of gripping points on a workpiece. The shape and arrangement of the radial beams 20a-f then determine the relative position of the gripping elements 12 to each other, that is to say the positions of the gripping points.

Figure 3:
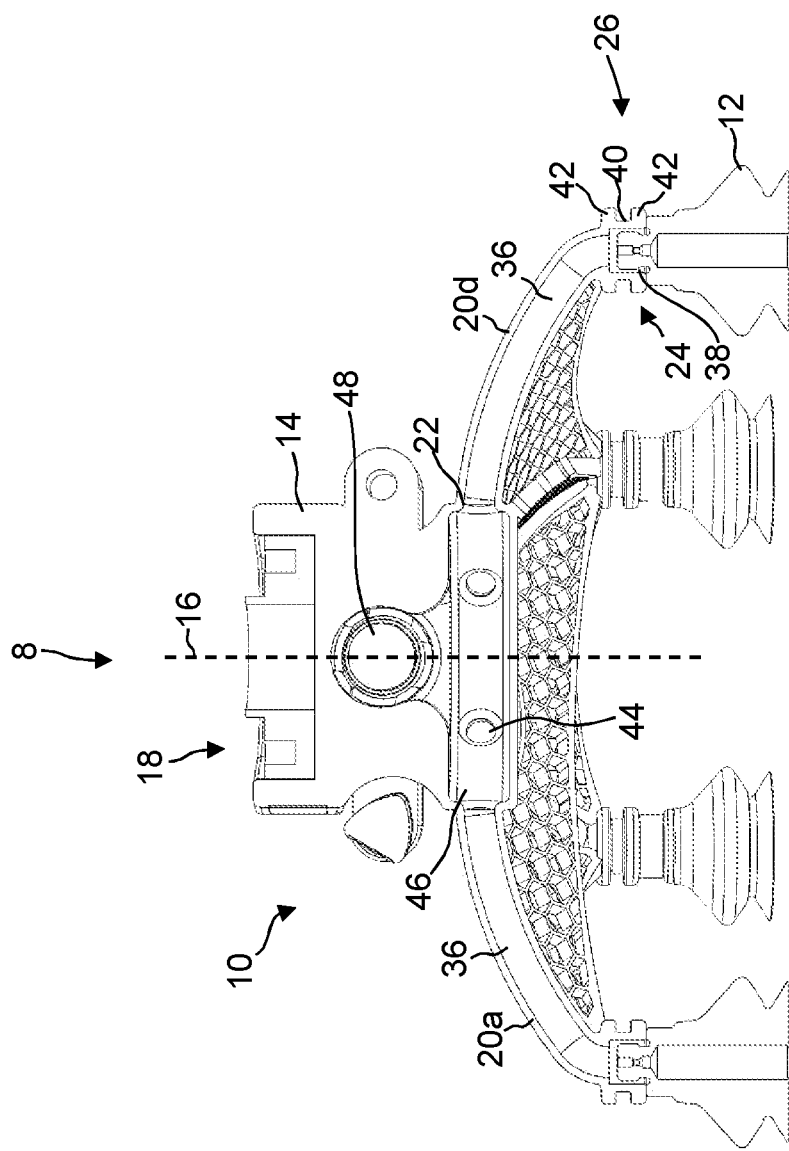
FIG. 3 is a sketched representation of the handling device according to FIG. 1, in a vertical section.

As can be seen from FIG. 3, the radial beams 20a-f follow a curve along each of their respective longitudinal extensions from the first end 22 to the second end 24. In the example shown, the radial beams 20a-f are curved such that the second ends 24 lie in a common plane. The gripping elements 12 connected to the radial beams 20a-f are oriented parallel to each other in such a manner that they can grip a flat surface of a workpiece (not shown) in a direction orthogonal to this surface.

The radial beams 20a-f are arranged around the central axis 16 offset from each other along a circumference (see FIGS. 1 and 4). Each radial beam 20a-f is connected to a radial beam 20a-f following it in the circumferential direction about the central axis 16 via a lattice wing 28a-f. Each pair of one radial beam 20a-f and a lattice wing 28a-f connected to it together form a structural element 30a-f, which forms a basic building block for the construction of the support frame 10.

Figure 2:
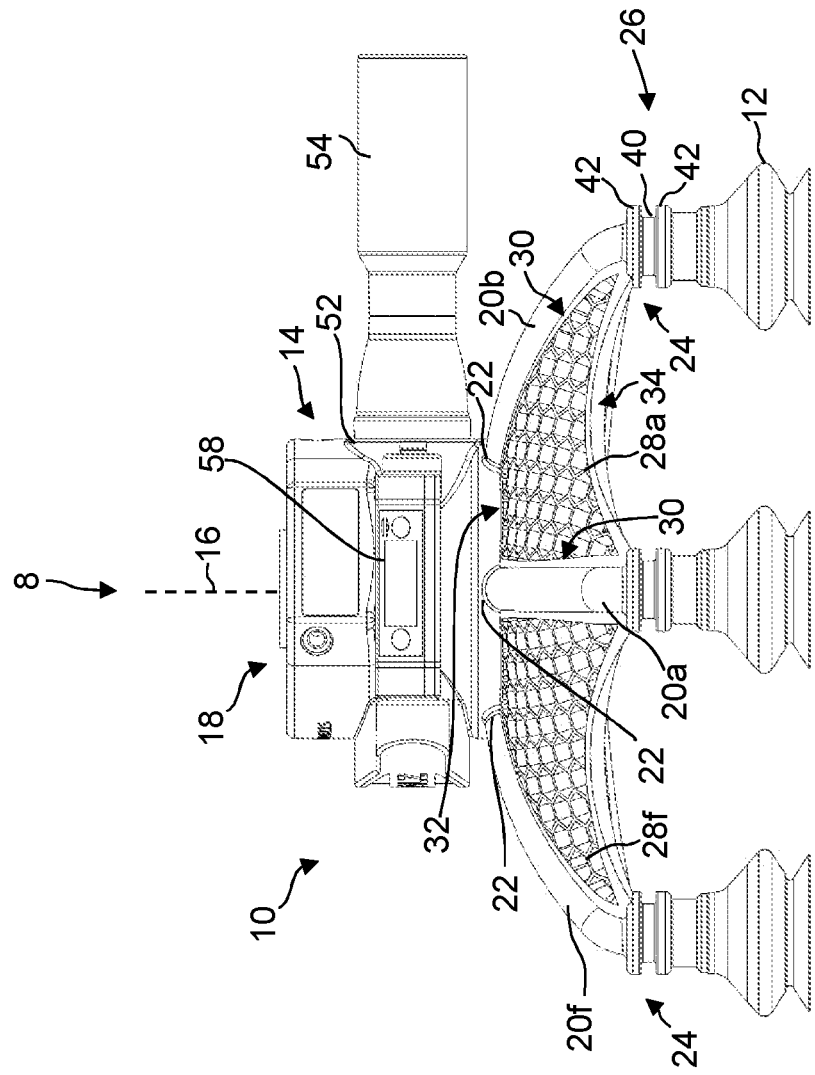
FIG. 2 is a sketched representation of the handling device according to FIG. 1, in a side view.

As can be seen from FIG. 2, each lattice wing 28a is integrally connected with the radial beam 20a, 20b assigned to it, and runs with its connecting edge 30 between the first end 22 and the second end 24 of the radial beam 20a, 20b. The structural elements 30a-f are thus integrally connected with each other in such a manner that a monolithic overall structure of the support frame 10 is produced. In this respect, it is indistinguishable which radial beam 20a-f forms a structural element 30a-f with which lattice wing 28a-f.

Each lattice wing 28a-f is also integrally connected with the base body 14 and extends with a further connecting edge 32 on an outer side of the base body 14 between the first ends 22 of the radial beams 20a-f connected to the lattice wing 28a-f. In the direction facing away from the base body 14, that is to say in the direction of the second ends 24 of the respective radial beams 20a-f, the lattice wing 28a is delimited by an outer edge 34. As can be seen from FIG. 1, the outer edge 34 follows, by way of example, and preferably, a concave course with respect to the base body 14.

Figure 5:
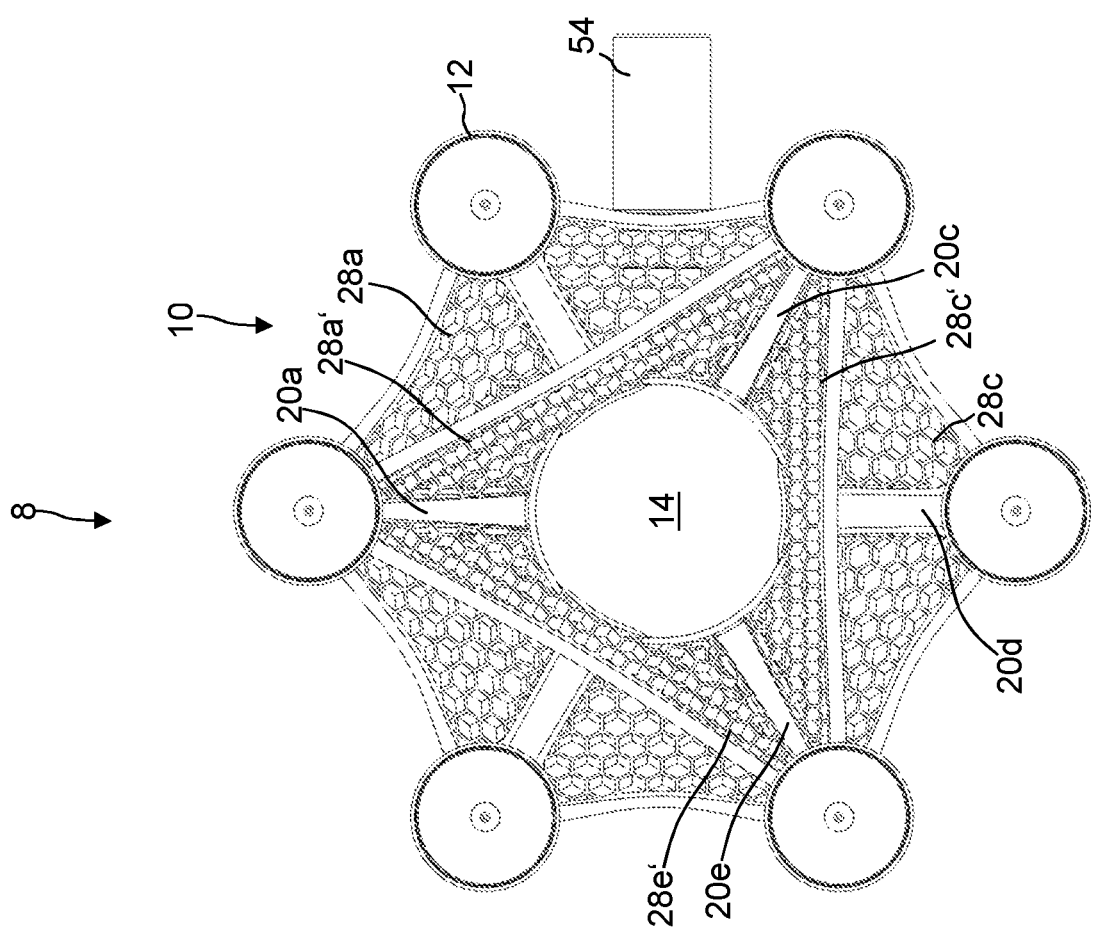
FIG. 5 is a sketched representation of the handling device of FIG. 1, in a bottom view.

In the example shown, a subset of the radial beams 20a, 20c, 20e is optionally connected in an analogous manner to a further radial beam 20a,c,e via respective second lattice wings 28a', 28c', 28e' (see FIG. 5).

By way of example, and preferably, the lattice wings 28a-e, 28a', 28c', 28e' are designed as honeycomb lattices. However, other types of lattices can also be contemplated.

In the embodiment of the support frame 10 shown in the figures, the radial beams 20a-f are arranged evenly along a circumference around the central axis 16, and are designed to have the same shape (see FIG. 4). In embodiments that are not shown, it is also possible for the radial beams 20a-f to be arranged offset from each other at irregular intervals about the central axis 16, and/or for the respective shapes of each of the radial beams 20a-f or the lattice wings 28a-f to differ from each other.

As can be seen from FIG. 3, the radial beams 20a-f are tubular with an internal fluid channel 36 which runs from the first end 22 of the respective radial beam 20a-f to the second end 24 of this radial beam 20a-f. The fluid channels 36 thus form a fluid line for supplying the gripping elements 12 with negative or positive pressure.

As can be seen from FIG. 3, the gripping elements 12, along with their respective fastening sections 38, by way of example, and preferably, in the form of a threaded section, are arranged in the region of the connecting section 26 of the respective radial beam 20a-f in the fluid channel 36, such that the gripping element 12 is connected with the fluid channel 36 in terms of both flow and pressure.

To facilitate installation of the gripping element 12 on a radial beam 20a-f, each radial beam 20a-f has a circumferential groove 40 in the region of its connecting section 26 arranged on its outside, and encircling the radial beam 20a-f on its circumference perpendicular to the longitudinal extension thereof. The groove 40 is formed by two annular elevations 42 which are arranged at a distance from each other along the longitudinal extension of the radial beam 20a-f, and which each protrude beyond a surrounding outer contour of the radial beam 20a-f.

As can be seen from FIG. 3, the fluid channels 36 open at the first end 22 of a respective radial beam 20a-f via a corresponding opening 44 into a distributor chamber 46, which is formed integrally with the base body 14 and which is designed to apply negative or positive pressure to the fluid channels 36.

To apply negative pressure to the distributor chamber 46, a vacuum ejector (not shown) is provided, which is designed to generate negative pressure from compressed air. The vacuum ejector is arranged in a receiving space 48 (see FIG. 3) of the base body 14 and can be pressurized with compressed air via a pneumatic connection section 50 (see FIG. 1) of the base body 14. The distribution chamber 46 is then connected to a vacuum outlet of the vacuum ejector. To output the compressed air, a positive pressure outlet 52 is also provided on the base body 14, which is preferably equipped, by way of example, with a silencer 54.

In embodiments that are not shown, it is possible for the distribution chamber 46 to be connected to the pneumatic connection section 50 directly in terms of flow and pressure. Then the pneumatic connection section 50 is connected in particular to an external vacuum supply. The external vacuum supply can be, for example, a vacuum supply line. It is also possible for the vacuum supply to be formed by an electrical vacuum generation unit. Then it is preferred that the pneumatic connection section 50 is integrated into the flange section 18.

The base body 14 also has a receiving space 56 for receiving a valve device 58, which is designed in particular to control a supply of negative pressure or positive pressure to the handling device 8 (see FIG. 1).

In embodiments that are not shown, it is also possible that the handling device 8 also has a valve device which is designed to control the individual fluid channels 36 independently of each other.

Figure 6:
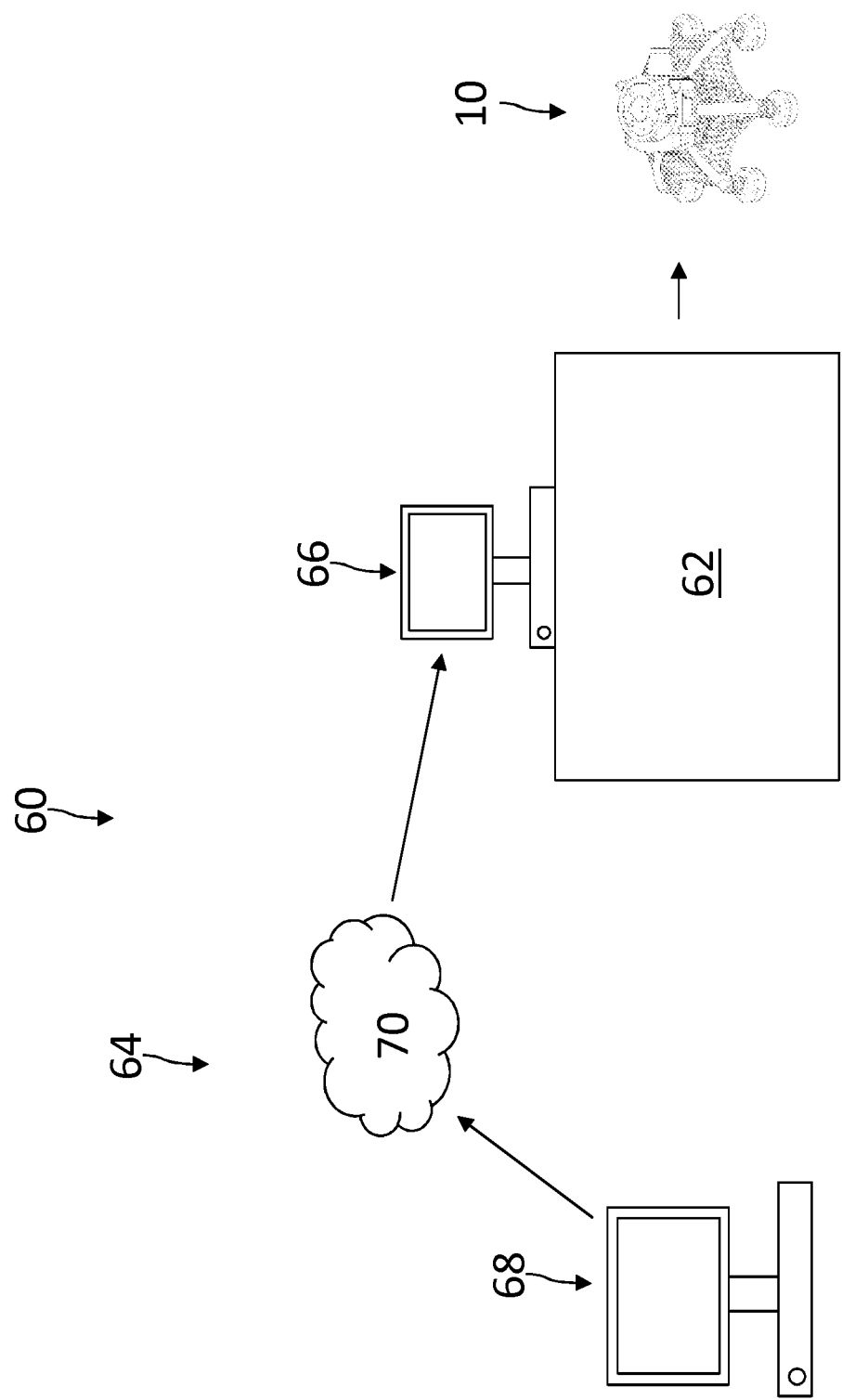
FIG. 6 is a simplified schematic representation of an exemplary embodiment of a system for carrying out the method according to the invention for producing a support frame.

FIG. 6 shows a simplified schematic illustration of a system 60 for producing a support frame 10, on the basis of which the method according to the invention is to be explained by way of example.

The system 60 comprises a device 62 for the additive manufacturing of components, in particular in the form of a 3D printer. The system 60 further comprises a data processing system 64 for controlling the device 62.

In the example shown, the data processing system 64 comprises a control computer 66 for controlling the device 62 and an operating computer 68 with a data connection to the control computer 66 via a server connection 70, in particular via a cloud server connection. It is possible that the server connection 70 comprises further computers (not shown). In particular, it is possible for partial steps of the method to be carried out on different computers.

To manufacture a support frame 10, information about a workpiece to be gripped (e.g. geometry, weight, etc.) and/or gripping process information (e.g. expected acceleration) is first provided by the user via the operating computer 68—by way of example, and preferably, by means of a configuration program provided via a web interface. For example, a user can upload a workpiece dataset (CAD data) representing the overall structure of the workpiece via the operating computer 68 and then select a workpiece weight via an input mask. Preferably, information is also provided on a gripping element type used later, in particular by selecting a gripping element type from gripping element types present in a database stored in the data processing system.

In a further step, the number of gripping points required for gripping the workpiece is then determined from the workpiece information and gripping process information by means of the data processing system 64. The number of gripping points represents a first boundary condition for designing the support frame 10 by means of the data processing system (see below).

The user can then determine the specific positions of the gripping points, the positions of the gripping points representing a second boundary condition for the design of the support frame. For this purpose, it is possible that a shape of the workpiece to be gripped is first displayed on the screen of the operating computer 68 (by way of example, and preferably, on the basis of a workpiece dataset uploaded by the user), and the user then selects the gripping points on the workpiece shown via an input device (for example a computer mouse).

Optionally, further boundary conditions can be provided by the user or already stored in a storage device of the data processing system 64.

According to the boundary conditions, the data processing system 64 then determines a support frame dataset, which represents the shape of a support frame 10, in such a manner that the boundary conditions are met.

In a further step, control signals are then generated which are designed to cause the device 62 to produce a support frame 10 with an overall structure according to the support structure dataset.

In a further step, the device 62 is then controlled by the control computer 66 according to the control signals, so that the device 62 produces a support frame 10 having an overall structure according to the support structure dataset.

The invention claimed is:

1. A support frame for a handling device having at least two pneumatically actuatable gripping elements, comprising a base body and at least two structural elements extending away from the base body,
    wherein the at least two structural elements are constructed similarly to each other in that they have at least the following common features:
        a radial beam of elongated design, having a first end and having a second end, the second end having a connecting section for connection to a pneumatically actuatable gripping element,
        a lattice wing which is integrally connected with the radial beam and which runs between the first end of the radial beam and the second end of the radial beam, wherein the lattice wing extends flatly away from the radial beam,
    wherein for each of the at least two structural elements the first end of the radial beam is integrally connected with the base body in such a manner that the radial beam extends away from the base body,
    wherein each lattice wing of the respective structural elements is integrally connected with an adjacent structural element in such a manner that said lattice wing runs between the first end of the radial beam of the adjacent structural element and the second end thereof,
    wherein at least one radial beam is of tubular design, with an internal fluid channel which runs from the first end to the second end of the radial beam,
    wherein the base body has at least one pneumatic connection section and a distribution chamber connected with the at least one pneumatic connection section, and
    wherein the fluid channels of the radial beams open into the distribution chamber.

2. The support frame according to claim 1, wherein at least one radial beam is curved at least in sections.

3. The support frame according to claim 1, wherein at least one radial beam has a groove in the region of its connecting section, arranged on its outside and encircling the radial beam along its circumference.

4. The support frame according to claim 1, wherein the lattice wing is integrally connected with the base body.

5. The support frame according to claim 1, wherein the lattice wing extends completely from the first end of a radial beam connected to it to the second end of this radial beam.

6. The support frame according to claim 1, wherein the lattice wing has an outer edge which delimits the lattice wing in the direction facing away from the base body or in the direction of the second ends of the radial beam connected to this lattice wing, wherein the outer edge runs along a concave course.

7. The support frame (10) according to claim 1, wherein the base body has a flange section for connecting the support frame to an external component.

8. The support frame according to claim 1, wherein the base body also has a receiving space to receive at least one vacuum ejector and/or a valve device.

9. A method for producing a support frame for a handling device having at least two pneumatically actuatable ripping elements, including a base body and at least two structural elements extending away from the base body, wherein the at least two structural elements are constructed similarly to each other in that they have at least the following common features: a radial beam of elongated design, having a first end and having a second end, the second end having a connecting section for connection to a pneumatically actuatable gripping element, a lattice wing which is integrally connected with the radial beam and which runs between the first end of the radial beam and the second end of the radial beam, wherein the lattice wing extends flatly away from the radial beam, wherein for each of the as least two structural elements the first end of the radial beam is integrally connected with the base body in such a manner that the radial beam extends away from the base body, and wherein each lattice wing of the respective structural elements is integrally connected with an adjacent structural element in such a manner that said lattice wing runs between the first end of the radial beam of the adjacent structural element and the second end thereof, the method comprising the following steps:
    a) providing boundary conditions for a design of the support frame in a data processing system, comprising at least one first boundary condition which represents the number of gripping points, and a second boundary condition which represents the positions of the gripping points;
    b) determining a configuration of the support frame according to the specified boundary conditions using, the data processing system, comprising:
    aa) determining a number of structural elements according to the number of gripping points;
    bb) determining a shape and arrangement of a radial beam according to the positions of the gripping points, wherein the shape and arrangement of the radial beam are determined under the boundary condition that the first end of the radial beam is integrally connected with the base body;

cc) determining a shape and arrangement of a lattice wing which is assigned to a radial beam, the shape and arrangement of the lattice wing being determined under the boundary condition that the lattice wing is connected with said radial beam and is connected to an adjacent radial beam in such a manner that the lattice wing extends in each case between the first end and the second end of the radial beam;

c) determining a support frame dataset by means of the data processing system which represents the shape of the support frame;

d) producing the support frame according to the support frame dataset by means of a device for additive manufacturing of components.

10. The method according to claim 9, wherein the shape and arrangement of the radial beam are further determined under the boundary condition that the radial beam is tubular in shape, with an internal fluid channel which extends from the first end to the second end of the radial beam.

11. The method according to claim 9, wherein the shape and arrangement of the radial beam are further determined under the boundary condition that the radial beam is curved at least in sections.

12. The method according to claim 9, wherein the shape and arrangement of the radial beam are further determined under the boundary condition that the radial beam has a groove in the region of its connecting section, arranged on its outside and encircling the radial beam along its circumference.

13. The method according to claim 9, wherein the shape and arrangement of the lattice wing are further determined under the boundary condition that the lattice wing is integrally connected with the base body.

14. The method according to claim 9, wherein the shape and arrangement of the lattice wing are further determined under the boundary condition that the lattice wing extends completely from the first end of a radial beam connected to it to the second end of this radial beam.

15. The method according to claim 9, wherein the shape and arrangement of the lattice wing are further determined under the boundary condition that an outer edge of the lattice wing which delimits the lattice wing in the opposite direction facing away from the base body or in the direction of the second ends of the radial beam connected to this lattice wing, is designed to run along a concave course.

16. The method according to claim 9, wherein the shape and arrangement of the lattice wing are further determined under the boundary condition that the lattice wing is designed in such a manner that a maximum diameter of the lattice openings does not exceed 20 mm.

17. The method according to claim 9, wherein the shape and arrangement of the lattice wing are further determined under the boundary condition that the lattice wing is designed as a honeycomb grid.

18. The method according to claim 9, wherein the form and arrangement of the base body are further determined under the boundary condition that the base body has at least one pneumatic connection section and a distribution chamber connected to the at least one pneumatic connection section.

19. The method according to claim 9, wherein the shape and arrangement of the base body and the shape and arrangement of the radial beam are further determined under the boundary condition that a fluid channel of the radial beam opens into a distribution chamber of the base body.

20. The method according to claim 9, wherein the shape and arrangement of the base body are further determined under the boundary condition that the base body has a flange section.

21. The method according to claim 9, wherein the shape and arrangement of the base body are further determined under the boundary condition that the base body has a receiving space to receive a vacuum ejector and/or a valve device.

22. The method according to claim 9, wherein the number of gripping points is determined with the aid of the data processing system, the determination comprising the following steps:

providing workpiece information in the data processing system;

providing gripping process information in the data processing system or by entering and/or selecting the gripping process information in the data processing system;

determining a number of gripping points required for gripping the workpiece, by means of the data processing system, according to the workpiece information and gripping process information provided.

23. The method according to claim 22, wherein providing the workpiece information comprises the following steps:

providing geometry data of a workpiece to be gripped, by reading a workpiece dataset representing the overall structure of the workpiece to be gripped into the data processing system, or by selecting a workpiece standard geometry from workpiece standard geometries present in a database stored in the data processing system, and entering workpiece dimensions;

entering workpiece properties.

24. The method according to claim 22, wherein the determination of the number of gripping points is additionally carried out according to information provided in the data processing system, relating to a gripping element type, wherein the provision of the information relating to the gripping element type comprises selecting a gripping element type from gripping element types in a database stored in the data processing system.

25. The method according to claim 9, wherein the positions of the gripping points are determined by means of the data processing system, the determination comprising the following steps:

providing geometry data of a workpiece to be gripped, by reading a workpiece dataset representing the overall structure of the workpiece to be gripped into the data processing system, or by selecting a workpiece standard geometry from workpiece standard geometries present in a database stored in the data processing system, and entering workpiece dimensions;

displaying the overall structure of the workpiece to be gripped according to the geometry data by means of a display device connected to the data processing system;

selecting and/or entering, by an operator, gripping points on the workpiece shown.

* * * * *